(12) United States Patent
Komai

(10) Patent No.: US 10,005,318 B2
(45) Date of Patent: Jun. 26, 2018

(54) PROTECTIVE COVER AND BEARING DEVICE INCLUDING PROTECTIVE COVER

(71) Applicant: NAKANISHI METAL WORKS CO., LTD., Osaka-shi, Osaka (JP)

(72) Inventor: Toshinari Komai, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 5 days.

(21) Appl. No.: 15/666,660

(22) Filed: Aug. 2, 2017

(65) Prior Publication Data

US 2017/0326914 A1 Nov. 16, 2017

Related U.S. Application Data

(62) Division of application No. 14/836,046, filed on Aug. 26, 2015.

(30) Foreign Application Priority Data

Aug. 28, 2014 (JP) .................................. 2014-173807
Jun. 5, 2015 (JP) .................................. 2015-114475

(51) Int. Cl.
*F16C 33/78* (2006.01)
*F16C 19/18* (2006.01)
(Continued)

(52) U.S. Cl.
CPC ........ *B60B 27/0073* (2013.01); *B60B 7/0013* (2013.01); *B60B 27/0005* (2013.01); *B60B 27/0068* (2013.01); *F16C 33/723* (2013.01); *F16C 33/7816* (2013.01); *F16C 41/007* (2013.01); *G01D 5/24433* (2013.01); *G01P 1/026* (2013.01); *G01P 3/487* (2013.01); *B60B 27/00* (2013.01); *B60B 2310/316* (2013.01);
(Continued)

(58) Field of Classification Search
CPC ........ F16C 33/723; F16C 35/00; F16C 35/04; F16C 2326/02; B60B 27/0073
See application file for complete search history.

(56) References Cited

U.S. PATENT DOCUMENTS 7,122,086 B2   10/2006   Tanaka et al.
7,198,407 B2    4/2007   Iiya et al.
(Continued)

FOREIGN PATENT DOCUMENTS

JP   2005-241351 A   9/2005
JP   2011-084265 A   4/2011

*Primary Examiner* — Alan B Waits
(74) *Attorney, Agent, or Firm* — Kratz, Quintos & Hanson, LLP

(57) ABSTRACT

The present invention is intended to provide a protective cover, comprising an inner ring 12 with an inner ring track surface 12A on an outer peripheral surface; an outer ring 13 with an outer ring track surface 13A on an inner peripheral surface; a bearing with rolling elements 14 between the inner ring track surface 12A and the outer ring track surface 13A; a magnetic encoder 8 that is positioned at one axial end portion of the bearing and fixed to the inner ring 12; and a magnetic sensor that is fixed to the outer ring 13, a cup-shaped protective cover 1 press-fitted into the outer ring 13 to cover the magnetic encoder 8 and intervene between the magnetic encoder 8 and the magnetic sensor is formed by performing cold press molding of an austenitic stainless steel plate material with a nickel content of 8.5 to 13 weight %.

2 Claims, 5 Drawing Sheets

(51) Int. Cl.
  *B60B 27/00* (2006.01)
  *G01P 1/02* (2006.01)
  *G01D 5/244* (2006.01)
  *G01P 3/487* (2006.01)
  *F16C 41/00* (2006.01)
  *F16C 33/72* (2006.01)
  *B60B 7/00* (2006.01)
  *G01D 5/245* (2006.01)

(52) U.S. Cl.
  CPC . *B60B 2360/102* (2013.01); *B60B 2900/1212* (2013.01); *B60B 2900/211* (2013.01); *B60B 2900/511* (2013.01); *B60B 2900/931* (2013.01); *C21D 2211/001* (2013.01); *F16C 19/186* (2013.01); *F16C 2204/72* (2013.01); *F16C 2326/02* (2013.01); *G01D 5/2451* (2013.01)

(56) References Cited

U.S. PATENT DOCUMENTS

| | | |
|---|---|---|
| 8,393,795 B2 | 3/2013 | Aritake et al. |
| 8,585,298 B2 | 11/2013 | Komori et al. |
| 8,882,358 B2 | 11/2014 | Inohae et al. |
| 8,915,649 B2 | 12/2014 | Seki et al. |
| 9,297,420 B2 | 3/2016 | Baratti et al. |
| 2009/0022441 A1 | 1/2009 | Berthier et al. |
| 2010/0027927 A1 | 2/2010 | Koyagi et al. |
| 2015/0010255 A1 | 1/2015 | Ishida |
| 2015/0117806 A1 | 4/2015 | Ito |
| 2015/0343841 A1 | 12/2015 | Kaiser et al. |

[Fig. 3]
(a)
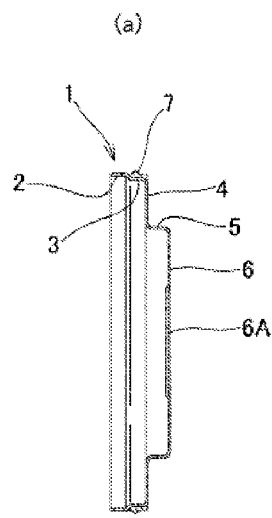
[Fig. 3]
(b)
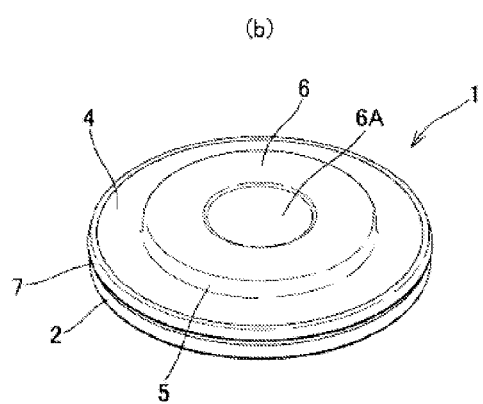

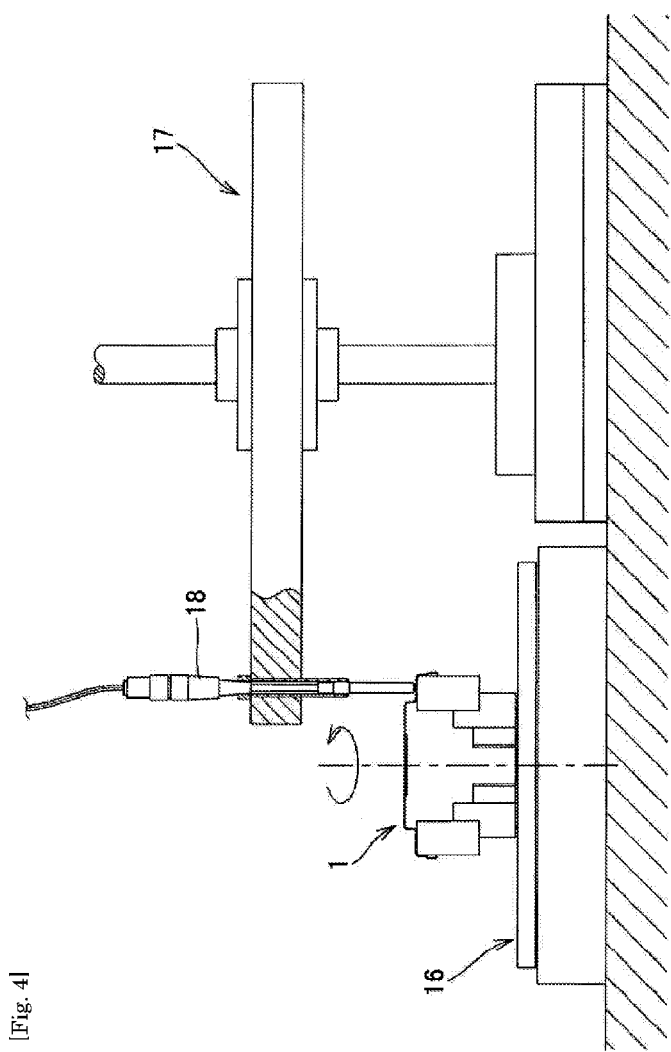

PROTECTIVE COVER AND BEARING DEVICE INCLUDING PROTECTIVE COVER

CROSS REFERENCE TO RELATED APPLICATIONS

This application is a divisional of U.S. patent application Ser. No. 14/836,046, filed Aug. 26, 2015, which claims priority to Japanese Patent Application No. 2014-173807, filed Aug. 28, 2014, and Japanese Patent Application No. 2015-114475, filed Jun. 5, 2015, which are hereby incorporated herein by reference in their entirety.

TECHNICAL FIELD

The present invention relates to a cup-shaped protective cover that is press-fitted into an outer ring of a bearing to cover a magnetic encoder, and a bearing device including the protective cover.

BACKGROUND ART

The antilock brake system (ABS) for use in efficient and safety braking without locking of wheels of automobiles was included in 45% of automobiles produced in Japan in 1996, and in more than 90% in 2009. At present, the antilock brake system is included in most of automobiles.

The widespread antilock brake system is intended, for example, to detect the rotation speeds of wheels by a rotation speed detector (wheel speed sensor), calculate the acceleration and the deceleration and estimate the vehicle speed and the slip ratio by a controller, and drive an actuator to control the brake fluid pressure based on the calculation and estimation results.

Bearing device with such a rotation speed detector in a roll bearing for supporting automobile wheels (hub bearing) is also widely used. There is a bearing device structured such that a seal member is fitted to the inner side of opposed surfaces of a rotational inner ring and a fixed outer ring, a magnetic encoder with N and S poles alternately arranged at regular intervals in the circumferential direction is attached to the inner ring at the inner side of the seal member, and a magnetic sensor is attached to the outer ring so as to be opposed to the magnetic encoder to detect the rotation of the magnetic encoder (for example, refer to Patent Document 1).

In the structure of the bearing device as described in Patent Document 1, muddy water or magnetized iron pieces may enter between the magnetic encoder and the magnetic sensor, which causes damage to the magnetic encoder and the magnetic sensor or changes in magnetic property of the magnetic encoder. In addition, the rotation torque of the bearing device increases due to sliding resistance of the seal member positioned at the outer side of the magnetic encoder.

To solve these problems, there is a bearing device in which a cup-shaped protective cover is press-fitted into the inner end portion of the outer ring to cover the magnetic encoder from the inner side without the seal member (for example, refer to Patent Document 2).

CITATION LIST

Patent Literatures

Patent Document 1: JP-A No. 2005-241351
Patent Document 2: JP-A No. 2011-084265

SUMMARY OF INVENTION

Technical Problem

According to Patent Document 2, the magnetic force of the magnetic encoder needs to penetrate through the protective cover and reach the magnetic sensor, and thus the protective cover is to be non-magnetic and corrosion-resistive. Accordingly, the material for the protective cover is generally an austenitic stainless steel SUS304 containing chrome-nickel as a main component. The protective cover is generally formed by performing press molding of a SUS304 plate material.

The inventor of the subject application has produced a protective cover of a desired shape by performing cold press molding of a general-composition SUS304 plate material and has found that a large part of the plate material changed from austenite to martensite due to deformation-induced martensitic transformation.

The martensite structure has the property of being magnetized. When the protective cover with a large part having undergone deformation-induced martensitic transformation is used, the protective cover may disturb a magnetic field between the magnetic encoder and the magnetic sensor to exert an adverse effect on detection accuracy.

The part having undergone deformation-induced martensitic transformation can be returned to austenite by solution treatment (solution heat treatment). However, the execution of solution treatment leads to cost increase and may cause dimension changes due to heating.

Accordingly, it is desired to use an austenitic stainless steel plate for the protective cover without any portion having undergone deformation-induced martensitic transformation or with a small portion having undergone deformation-induced martensitic transformation when the cup-shaped protective cover is formed by performing cold press molding of the material.

In view of the foregoing circumstances, an object of the present invention is to provide a protective cover that is less magnetized and is likely to satisfy required specifications for residual magnetic property when the protective cover is formed by performing cold press molding of an austenitic stainless steel plate material.

Solution to Problem

The inventor of the subject application has earnestly studied an austenitic stainless steel material including chrome nickel as a main component, taking notice of a nickel content relative to the total weight. Then, the inventor has tried to produce a cup-shaped protective cover sufficiently satisfying required specifications for residual magnetic property through cold press molding while suppressing the content of nickel as an expensive metal but making the content of nickel higher than the general content of nickel in a commercially supplied SUS304. Then, the inventor has evaluated and examined the residual magnetic property of the protective cover after the press molding, thereby completing the present invention.

Specifically, to solve the foregoing problems, the protective cover according to the present invention is a cup-shaped protective cover for a bearing device including: an inner ring with an inner ring track surface on an outer peripheral surface; an outer ring with an outer ring track surface on an inner peripheral surface; a bearing with a rolling element between the inner ring track surface and the outer ring track surface; a magnetic encoder that is positioned at one axial end portion of the bearing, fixed to the inner ring, and has N and S poles alternately arranged at regular intervals in the circumferential direction; and a magnetic sensor that is fixed to the outer ring so as to be opposed to the magnetic poles of the magnetic encoder to detect the rotation of the magnetic encoder, wherein the protective cover is press-fitted into the outer ring to cover the magnetic encoder and intervene between the magnetic encoder and the magnetic sensor, and the protective cover is formed by performing cold press molding of an austenitic stainless steel plate material with a nickel content of 8.5 to 13 weight %.

According to this configuration, the protective cover is formed by performing cold press molding of an austenitic stainless steel plate material with a nickel content of 8.5 to 13 weight %, and thus the residual flux density of nickel in the material (austenitic stainless steel) for the cold-pressed protective cover is significantly lower than that in the case of using a SUS304 with a general nickel content (about 8 weight %).

Accordingly, the cold-pressed protective cover is hardly magnetized and is likely to satisfy the required specifications for residual magnetic property.

In addition, since the protective cover is not subjected to solution treatment, it is possible to prevent increase in manufacturing costs and dimension changes due to heating to improve the yield of products.

The bearing device according to the present invention includes the protective cover.

Advantageous Effects of Invention

According to the present invention, the protective cover and the bearing device including the protective cover produce significant advantages that the cold-pressed protective cover has a low residual flux density, and thus is hardly magnetized and is likely to satisfy the required specifications for residual magnetic property.

BRIEF DESCRIPTION OF DRAWINGS

FIGS. 3(a) and (b) illustrate the protective cover according to the embodiment of the present invention: FIG. 3(a) is a vertical cross-sectional view; and FIG. 3(b) is a perspective view;

FIG. 4 is a front view of a configuration example of an experiment device that measures the residual flux density of a sensing surface of the protective cover.

DESCRIPTION OF EMBODIMENTS

Embodiment of the present invention will be described below in detail with reference to the accompanying drawings. However, the present invention is not limited to the embodiment illustrated in the accompanying drawings but includes all of embodiments satisfying requirements described in the claims.

Figure 1:
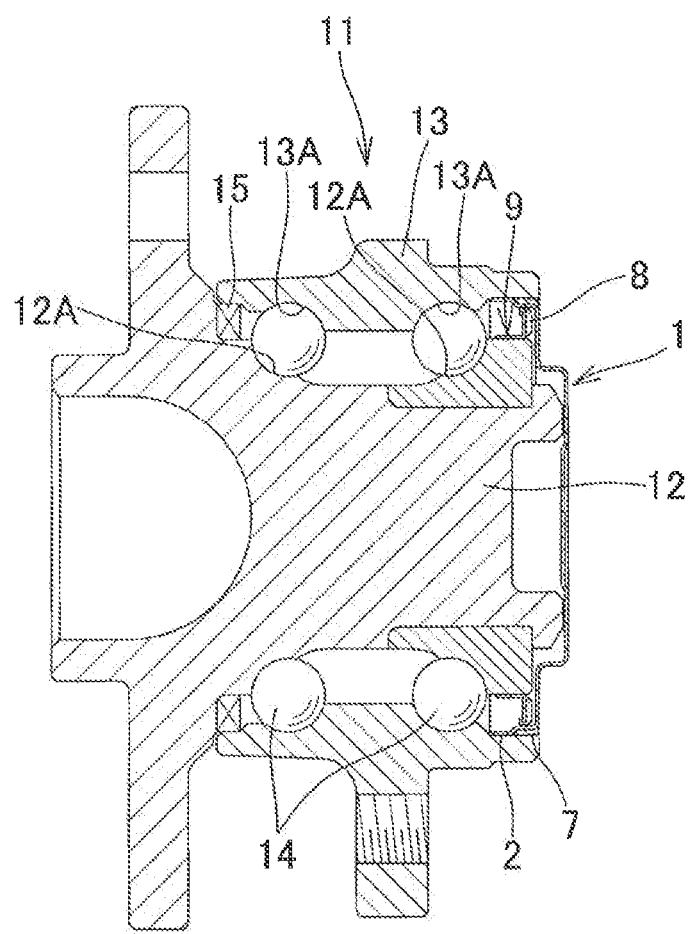
FIG. 1 is a vertical cross-sectional view of a bearing device with a protective cover according to an embodiment of the present invention.
Figure 2:
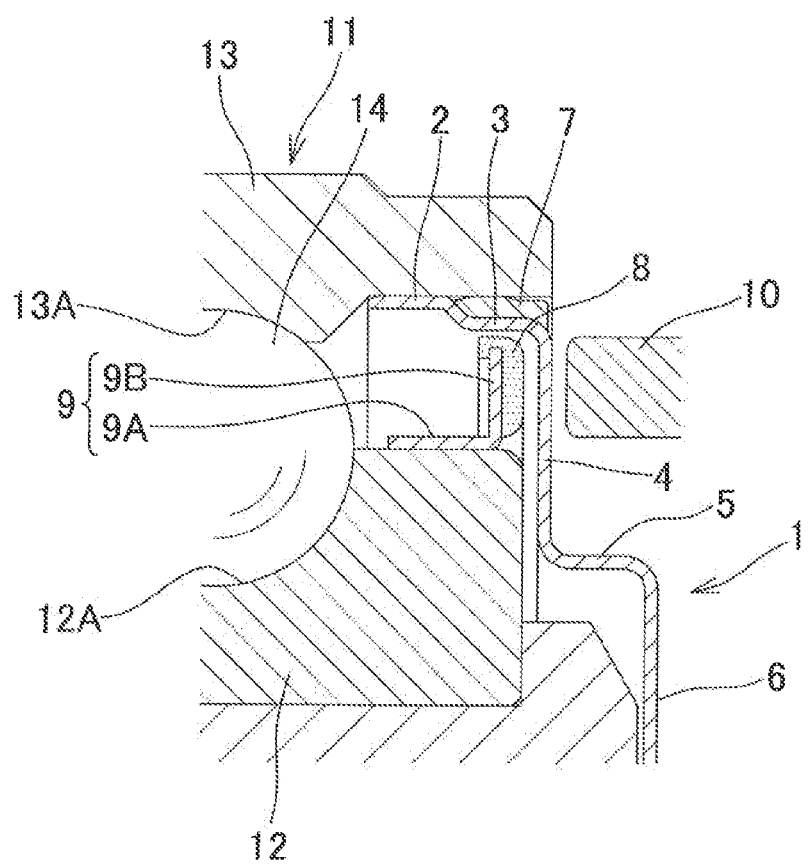
FIG. 2 is an enlarged vertical cross-sectional view of main parts of the same.

As illustrated in the vertical cross-sectional view of FIG. 1 and the enlarged vertical cross-sectional view of main parts of FIG. 2, a bearing device 11 according to the embodiment of the present invention includes: a bearing having an inner ring 12 with an inner ring track surface 12A on an outer peripheral surface, an outer ring 13 with an outer ring track surface 13A on an inner peripheral surface, and rolling elements 14, 14, . . . between the inner ring track surface 12A and the outer ring track surface 13A; a magnetic encoder 8 that is positioned at one axial end portion of the bearing and fixed to the inner ring 12; a magnetic sensor 10 that is fixed to the outer ring 13 and opposed to magnetic poles of the magnetic encoder 8 to detect rotation of the magnetic encoder 8; a cup-shaped protective cover 1 that is press-fitted into the outer ring 13 to cover the magnetic encoder 8 and intervene between the magnetic encoder 8 and the magnetic sensor 10; and a seal member 15 that is arranged at the other axial end portion of the bearing, and the like.

The inside of the bearing is sealed by the protective cover 1 and the seal member 15 at the both axial end portions of the bearing, and the magnetic encoder 8 is accommodated in the inner space of the bearing. This allows the magnetic encoder 8 and the inside of the bearing to be protected from foreign matter or the like.

The magnetic encoder 8 attached to the rotational inner ring 12 and having N and S poles alternately arranged at regular intervals in the circumferential direction and the magnetic sensor 10 attached to the fixed outer ring 13 constitute a rotation speed detector.

A support member 9 is composed of a cylindrical part 9A and an annular part 9B extended radially outward from the end edge of the cylindrical part 9A. The magnetic encoder 8 having N and S poles alternately arranged at regular intervals in the circumferential direction is fixed to the annular part 9B.

When the cylindrical part 9A is externally fitted to the inner ring 12, the magnetic encoder 8 is fixed to the inner ring 12 via the support member 9 to rotate the magnetic encoder 8 integrally with the inner ring 12.

As illustrated in the vertical cross-sectional view of FIG. 3(a) and the perspective view of FIG. 3(b), the protective cover 1 according to the embodiment of the present invention includes: a first cylindrical part 2 press-fitted into the outer ring 13 (refer to FIGS. 1 and 2); a second cylindrical part 3 smaller in diameter than the first cylindrical part 2 and connected to an end edge of the first cylindrical part 2; an annular part 4 connected to an end edge of the second cylindrical part 3 and extended radially inward; a third cylindrical part 5 connected to an inner diameter-side end edge of the cylindrical part 4 and extended in the axial direction; a disc part 6 connected to an end edge of the third cylindrical part 5; and a seal body 7 vulcanized and adhered to the outer peripheral surface of the second cylindrical part 3. A recess 6A is formed in the center of the disc part 6.

The base part of the protective cover 1 (except for the seal body 7) is formed by performing press molding of an austenitic stainless steel plate material with a nickel content of 8.5 to 13 weight %.

The seal body 7 is an elastic body such as synthetic rubber to improve airtightness between the protective cover 1 and the outer ring 13. The seal body 7 may be made from one of oil-resistant favorable rubber materials such as nitrile rubber (NBR), hydrogenated nitrile rubber (HNBR), acrylic rubber (ACM), ethylene-acrylic rubber (AEM), fluorine rubber (FKM, FPM), and silicone rubber (VQM), or a blend of two or more of the same.

Further, the surface of the plate material for the base part of the protective cover 1 is dull-finished. This makes working oil likely to be retained at the press molding and prevents baking at the drawing process. Accordingly, scratches on the surface of the protective cover 1 are less prominent, and the matted surface improves the appearance of the protective cover 1 and the adhesion of the seal body 7.

[Evaluation of Residual Magnetic Property]

Next, descriptions will be given as to experiments on the protective cover 1 formed by performing cold press molding of a material with a higher nickel content than a general nickel content (about 8% of the total weight) of a commercially supplied SUS304 for evaluation of residual magnetic property.

<Experimental Method>

(1) First, the protective cover 1 formed by performing cold press molding of an austenitic stainless steel plate material was stored in a magnetization coil (air core coil with a diameter of 100 mm produced by Magnet Force Co., Ltd). A saturation magnetic field was applied to the protective cover 1 by a magnetizing electric power supply (oil condenser-type magnetizing electric power supply MFC-1510 produced by Magnet Force Co., Ltd).

(2) Next, the protective cover 1 with the saturation magnetic field was fixed on a turning table 16 in axial alignment with each other, as illustrated in the front view of a configuration example of an experiment device of FIG. 4. A probe (axial probe MSA-410 produced by Toyo Corporation) supported by a support instrument 17 was arranged so as to be axially opposed to the sensing surface of the protective cover 1 with a gap of 0.5 mm therebetween in the height direction. A tesla meter (410-type handy gauss meter produced by Toyo Corporation) was used to measure the maximum value of the residual flux density of the protective cover 1 while the turning table 16 was turned.

EXAMPLES

As examples 1 to 3, commercially supplied austenitic stainless steel plate materials of the following steel grades were selected:

Example 1

Of JIS-based SUS304 materials with a nickel content of 8.00 to 10.50% relative to the total weight, a SUS304 with a nickel content of 8.79% was used.

Example 2

Of JIS-based SUS304L materials with a nickel content of 9.00 to 13.00% relative to the total weight, a SUS304L with a nickel content of 10.05% was used.

Example 3

Of JIS-based SUS316L materials with a nickel content of 12.00 to 15.00% relative to the total weight, a SUS316L with a nickel content of 12.17% was used.

Comparative Examples

As comparative examples 1 and 2, commercially supplied austenitic stainless steel plate materials of the following steel grades were selected:

Comparative Example 1

Of JIS-based SUS304 materials with a nickel content of 8.00 to 10.50% relative to the total weight, a SUS304 with a nickel content of 8.06% was used.

Comparative Example 2

Of JIS-based SUS304J2 materials with a nickel content of 6.00 to 9.00% relative to the total weight, a SUS304J2 with a nickel content of 6.67% was used.

<Experimental Results and Considerations>

Figure 5:
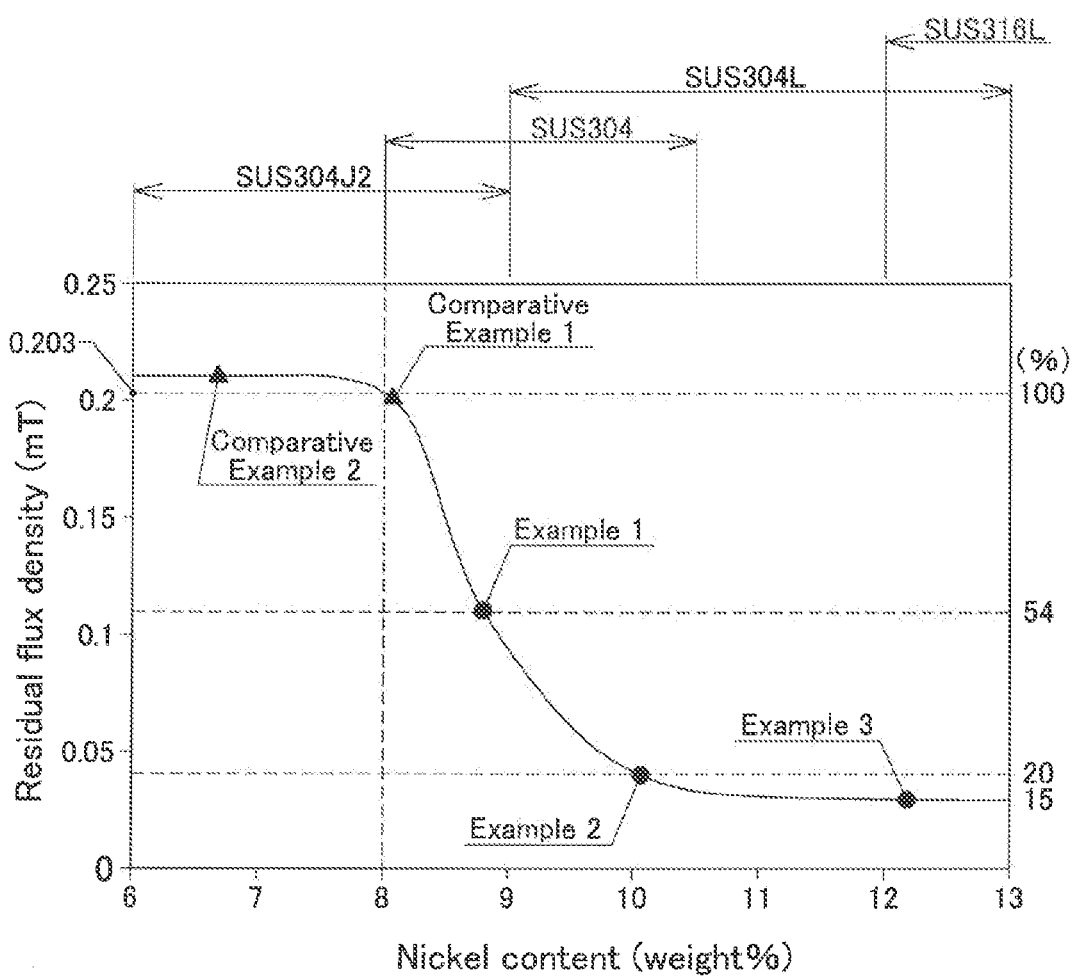
FIG. 5 is a graph showing the relationship between the nickel contents and the residual flux densities in Table 1.

Table 1 shows the measured maximum values of residual flux densities of the austenitic stainless steel protective covers of the examples 1 to 3 and the comparative examples 1 and 2. FIG. 5 illustrates the relationship between the nickel contents and the residual flux densities in Table 1.

TABLE 1

| | Example/Comparative example | | | | |
|---|---|---|---|---|---|
| | Example 1 | Example 2 | Example 3 | Comparative Example 1 | Comparative Example 2 |
| Material (JIS steel grade) | SUS304 | SUS304L | SUS316L | SUS304 | SUS304J2 |
| Nickel content (weight %) | 8.79 | 10.05 | 12.17 | 8.06 | 6.67 |
| Residual flux density (mT) | 0.11 | 0.04 | 0.03 | 0.20 | 0.21 |

It is understood from FIG. 5 that the austenitic stainless steel protective covers with relatively low nickel contents as the comparative examples 1 and 2 are larger in the measured maximum values of residual flux density, and the austenitic stainless steel protective covers with nickel contents of 8.5 weight % or more are smaller in the measured maximum values of residual flux density. In particular, it is noted that the austenitic stainless steel protective covers with nickel contents of 10 weight % or more are significantly smaller in the measured maximum values of residual flux density.

For example, the austenitic stainless steel protective cover with a nickel content of 10.05 weight % in the example 2 has the measured maximum value of residual flux density of 0.04 mT, and the austenitic stainless steel protective cover with a nickel content of 8.06 weight % in the comparative example 1 has the measured maximum value of residual flux density of 0.20 mT.

Accordingly, it is understood that, as compared to the comparative example 1 with the lower nickel content, the example 2 with the higher nickel content has a significant smaller measured value of residual flux density that is ⅕ of that of the comparative example 1, and the example 2 is thus less magnetized.

In addition, the same measurement was performed on a part other than the sensing surface (for example, the first cylindrical part 2 illustrated in FIG. 2), which revealed that the examples are significantly smaller in residual flux density than the comparative examples similar to the case of the sensing surface.

As described above, the content of nickel in an austenitic stainless steel plate material for cold press molding of a protective cover is more preferably 10 weight % or more from the viewpoint of making the protective cover less magnetized to satisfy required specifications for residual magnetic property, and is preferably 8.5 weight % or more from the viewpoint of making the protective cover less magnetized and suppressing the content of expensive nickel as much as possible.

Nickel is an expensive material and therefore the upper limit of a nickel content is preferably 13 weight % or less from the viewpoint of suppressing a nickel content and reducing manufacturing costs.

The material with a nickel content of 8.5 to 13 weight % may be preferably a SUS304 with a nickel content of 8.5 weight % or more as in the example 1, the SUS304L, the SUS316L, a JIS-based SUS305 with a nickel content of 10.50 to 13.00 weight % relative to the total weight, a SUS321 with a nickel content of 9.00 to 13.00 weight %, or a SUS347 with a nickel content of 9.00 to 13.00 weight %.

The protective cover 1 according to the embodiment of the present invention as described above is formed by performing cold press molding of an austenitic stainless steel plate material with a nickel content of 8.5 to 13 weight %. Therefore, the material for the protective cover 1 (austenitic stainless steel) is significantly smaller in residual flux density than the SUS304 with a general nickel content (about 8 weight %).

Accordingly, when being formed by cold press molding, the protective cover 1 is extremely less magnetized and is likely to satisfy required specifications for residual magnetic property.

In addition, since the protective cover 1 is not subjected to solution treatment, it is possible to prevent increase in manufacturing cost involved in the treatment and dimension changes due to heating, thereby improving the yield of the protective cover 1.

REFERENCE SIGNS LIST

1 Protective cover
2 First cylindrical part
3 Second cylindrical part
4 Annular part
5 Third cylindrical part
6 Disc part
6A Recess
7 Seal body
8 Magnetic encoder
9 Support member
9A Cylindrical part
9B Annular part
10 Magnetic sensor
11 Bearing device
12 Inner ring
12A Inner ring track surface
13 Outer ring
13A Outer ring track surface
14 Rolling element
15 Seal member
16 Turning table
17 Support instrument
18 Probe

The invention claimed is:
1. An apparatus, comprising:
a bearing having at least an inner ring, an outer ring, and a rolling element, the inner ring having an inner ring track surface on an outer peripheral surface, the outer ring having an outer ring track surface on an inner peripheral surface, and the rolling element being between the inner ring track surface and the outer ring track surface;
a support member having a cylindrical part and an annular part;
a magnetic encoder that is positioned at one axial end portion of the bearing, fixed to the inner ring, and has N and S poles alternately arranged at regular intervals in the circumferential direction, the magnetic encoder being fixed to the annular part of the support member, the cylindrical part of the support member being fixed to the inner ring;
a magnetic sensor that is fixed to the outer ring so as to be opposed to the magnetic poles of the magnetic encoder to detect the rotation of the magnetic encoder; and
a cup-shaped protective cover being press-fitted into the outer ring to cover the magnetic encoder and intervene between the magnetic encoder and the magnetic sensor,
wherein the protective cover is formed by performing cold press molding of an austenitic stainless steel plate material,
wherein the austenitic stainless steel plate material is selected so that a maximum value of residual flux density of a surface of the protective cover facing the magnetic sensor is less than or equal to 54%, with reference to a state where the austenitic stainless steel plate is SUS304 with the minimum nickel content (a nickel content of 8.00 weight %),
wherein the protective cover has a first cylindrical part substantially parallel to the cylindrical part of the support member, a second cylindrical part having a single section extending in a first direction substantially parallel to the cylindrical part of the support member, a first annular part substantially parallel to the annular part of the support member, a third cylindrical part substantially parallel to the cylindrical part of the support member, and a disc part substantially parallel to the annular part of the support member,
wherein the second cylindrical part is disposed between the first cylindrical part and the first annular part,
wherein the third cylindrical part is disposed between the first annular part and the disc part,
wherein the disc part is directly connected with the third cylindrical part,
wherein the single section extends from a first position located at a first side of the magnetic encoder to a second position located at a second side of the magnetic encoder,
wherein the single section is continuously substantially parallel to the cylindrical part of the support member without a stepped configuration,
wherein the first side of the magnetic encoder is disposed to face the rolling element,
wherein the second side of the magnetic encoder is disposed to face the magnetic sensor,
wherein the disc part is spaced apart from the inner ring along the first direction, and
wherein the annular part of the support member has a first side facing the rolling element and a second side facing the magnetic sensor, wherein the magnetic encoder is attached to the second side of the annular part of the support member.

2. The apparatus according to claim 1, further comprising a seal body adhered to the second cylindrical part, wherein the seal body includes at least one selected from among a group consisting of nitrile rubber, hydrogenated nitrile rubber, acrylic rubber, ethylene-acrylic rubber, fluorine rubber, and silicone rubber.

* * * * *